(12) United States Patent
Szita

(10) Patent No.: US 8,649,117 B2
(45) Date of Patent: Feb. 11, 2014

(54) METHOD OF WRITING A PREAMBLE FIELD ON A DISK DRIVE TO REDUCE TRACK SQUEEZE

(75) Inventor: Gabor Szita, Newark, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 147 days.

(21) Appl. No.: 13/292,875

(22) Filed: Nov. 9, 2011

(65) Prior Publication Data

US 2013/0114159 A1    May 9, 2013

(51) Int. Cl.
*G11B 5/02* (2006.01)

(52) U.S. Cl.
USPC .............................................. 360/24; 360/27

(58) Field of Classification Search
None
See application file for complete search history.

(56) References Cited

U.S. PATENT DOCUMENTS

| | | | |
|---|---|---|---|
| 6,693,760 B1 * | 2/2004 | Krounbi et al. | 360/75 |
| 6,862,155 B2 | 3/2005 | Yang et al. | |
| 6,963,465 B1 | 11/2005 | Melkote et al. | |
| 6,965,491 B1 * | 11/2005 | Perlmutter et al. | 360/77.04 |
| 7,167,335 B1 * | 1/2007 | Ehrlich | 360/75 |
| 7,542,230 B1 * | 6/2009 | Melrose et al. | 360/77.04 |
| 7,576,941 B1 * | 8/2009 | Chen et al. | 360/77.04 |
| 8,416,648 B2 * | 4/2013 | Szita et al. | 369/13.02 |
| 2003/0197969 A1 | 10/2003 | Szita et al. | |
| 2005/0207296 A1 | 9/2005 | Silva | |
| 2005/0237658 A1 * | 10/2005 | Ehrlich | 360/75 |

* cited by examiner

*Primary Examiner* — Paul Huber
(74) *Attorney, Agent, or Firm* — Patterson & Sheridan LLP

(57) ABSTRACT

Preamble fields are written on a storage disk in a hard disk drive in a way that reduces track squeeze. Preamble fields for a particular data storage track on the storage disk are written over multiple revolutions of the storage disk to eliminate low-frequency variations of the preamble stitch line from an ideal position of the preamble stitch line. By writing the preamble fields for one data storage track over multiple revolutions, and by writing the preamble fields in each revolution to non-consecutive servo wedges, low-frequency variations of the preamble stitch line from its ideal position can be converted to high-frequency variations of the preamble stitch line that do not produce low-frequency track squeeze.

8 Claims, 8 Drawing Sheets

METHOD OF WRITING A PREAMBLE FIELD ON A DISK DRIVE TO REDUCE TRACK SQUEEZE

BACKGROUND

1. Field of the Invention

Embodiments of the present invention relate generally to disk drives and, more particularly, to a method of writing a preamble field on a disk drive to reduce track squeeze.

2. Description of the Related Art

A disk drive is a data storage device that stores digital data in concentric tracks on the surface of a data storage disk. The data storage disk is a rotatable hard disk with a layer of magnetic material thereon, and data is read from or written to a desired track on the data storage disk using a read/write head that is held proximate to the track while the disk spins about its center at a constant angular velocity.

To properly align the read/write head with a desired track during a read or write operation, disk drives generally use a closed-loop servo system that relies on servo data stored in servo sectors written on the disk surface when the disk drive is manufactured. The servo sectors are written between user data fields on the track of interest. These servo sectors form "servo wedges" or "servo spokes" from the outer to inner diameter of the disk, and are either written on the disk surface by an external device, such as a servo track writer, or by the drive itself using a self servo-writing procedure. The read/write head can be positioned with respect to the data storage disk by using feedback control based on servo information read from the servo wedges with the read element of the read/write head. The servo sectors provide position information about the radial location of the read/write head with respect to the disk surface in the form of servo patterns or "servo bursts."

During the process of writing the servo wedges on a disk, servo sectors are typically written on the disk one data track at a time. Due to fluctuations in read/write head position while writing the servo patterns for a given data track, the servo patterns for the data track do not form a perfect circle on the disk. Instead, each servo pattern is generally written at a location having a certain displacement, or "runout," from the ideal track position. This displacement of servo patterns from the ideal track position is referred to as "written-in" repeatable runout (RRO).

As is known in the art, written-in RRO that produces high-frequency disturbances in the position of a read/write head can be readily compensated for during normal operation by implementing correction factors for each servo sector to facilitate smooth and controllable travel of the read/write head along a data track of a storage disk. However, low-frequency fluctuations in head position also generally occur as the servo patterns are written for a specific data track, and therefore produce low-frequency disturbances in the position of the read/write head during normal operation. Such low-frequency disturbances in head position, e.g., fluctuations having a frequency of less than about 500 Hz, are difficult to compensate for and can produce track squeeze, as illustrated below in FIG. 1.

FIG. 1 schematically illustrates a portion of a storage disk 100 and the paths followed by a head 107 as servo wedges are written to a first data track 101 and a second data track 102. Low-frequency fluctuations in the position of head 107 during the process of writing servo wedges 111-115 cause head 107 to vary from ideal track positions 101A, 102A, thereby producing track squeeze between first data track 101 and second data track 102. Track squeeze occurs when track-to-track spacing is inadequate to ensure the data integrity of adjacent data tracks. When writing the servo wedges for first data track 101, head 107 follows a write head path 110 that varies from ideal track position 101A at a low frequency. As a result, the servo information 140 for servo wedges 111-115 for first data track 101 is located along write head path 110, rather than along ideal track position 101A. Similarly, when writing the servo wedges for second data track 102, head 107 follows a write head path 120 that varies from ideal track position 102A at a low frequency, and servo information 150 for servo wedges 111-115 for second data track 102 is located along write head path 120, rather than along ideal track position 102A. Consequently, first data track 101 can vary from ideal track position 101A and second data track 102 can vary from ideal track position 102A in such a way that first data track 101 and second data track 102 partially or completely overlap. As a result, data stored in one track can overwrite data stored in an adjacent track, which is highly undesirable.

Furthermore, the low-frequency track squeeze illustrated in FIG. 1 is known to be the exacerbated by position error produced by preamble phase shift. In hard disk drives using null-pattern demodulation, the preamble field for each servo wedge provides a timing reference for the servo wedge, and preamble phase shift can occur due to the non-ideal shape of the magnetic flux transitions making up the preamble field of servo patterns written to servo wedges 111-115. Ideally, the preamble fields of adjacent data tracks are made up of linear magnetic flux transitions that are connected, or "stitched," together at a preamble stitch line between the adjacent data tracks to form a radially continuous line from track-to-track. In practice, such magnetic flux transitions are often written with unwanted curvature and/or tilt, producing significant discontinuity at the preamble stitch lines between data tracks. Such discontinuity can affect timing reference accuracy provided by the preamble field when a write head is positioned over the preamble stitch line. Thus, when head 107 is positioned over a preamble stitch line between two data tracks during normal operation, inaccuracy of the timing reference near the preamble stitch line can produce significant additional head position error. Such head position error can exaggerate any track squeeze already present between first data track 101 and second data track 102.

In light of the above, there is a need in the art for a system and method for preventing track squeeze in hard disk drives that use null-pattern demodulation schemes.

SUMMARY

One or more embodiments of the present invention provide systems and methods for writing a preamble field on a disk drive to reduce track squeeze. Preamble fields for a particular data storage track are written over multiple revolutions of a storage disk to eliminate low-frequency variations of the preamble stitch line from an ideal position of the preamble stitch line. By writing the preamble fields for one data storage track over multiple revolutions, and by writing the preamble fields in each revolution to non-consecutive servo wedges, low-frequency variations of the preamble stitch line from its ideal position can be converted to high-frequency variations of the preamble stitch line that do not produce low-frequency track squeeze.

A method of writing servo information on a magnetic storage medium while the magnetic storage medium is rotated, according to one embodiment of the present invention, includes the steps of, during a first revolution of the magnetic storage medium, writing first and second timing references on the magnetic storage medium at a common radial position, and, during a second revolution of the magnetic storage medium, writing a third timing reference on the magnetic storage medium at the common radial position and between the first and second timing references.

A method of writing servo information on a magnetic storage medium while the magnetic storage medium is rotated, according to another embodiment of the present invention, includes the steps of, during a first revolution of the magnetic storage medium, writing a timing reference on a first portion of the magnetic storage medium and a first portion of a servo burst on the magnetic storage medium, and, during a second revolution of the magnetic storage medium, writing a timing reference on a second portion of the magnetic storage medium and a second portion of the servo burst on the magnetic storage medium.

BRIEF DESCRIPTION OF THE DRAWINGS

So that the manner in which the above recited features of embodiments of the invention can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
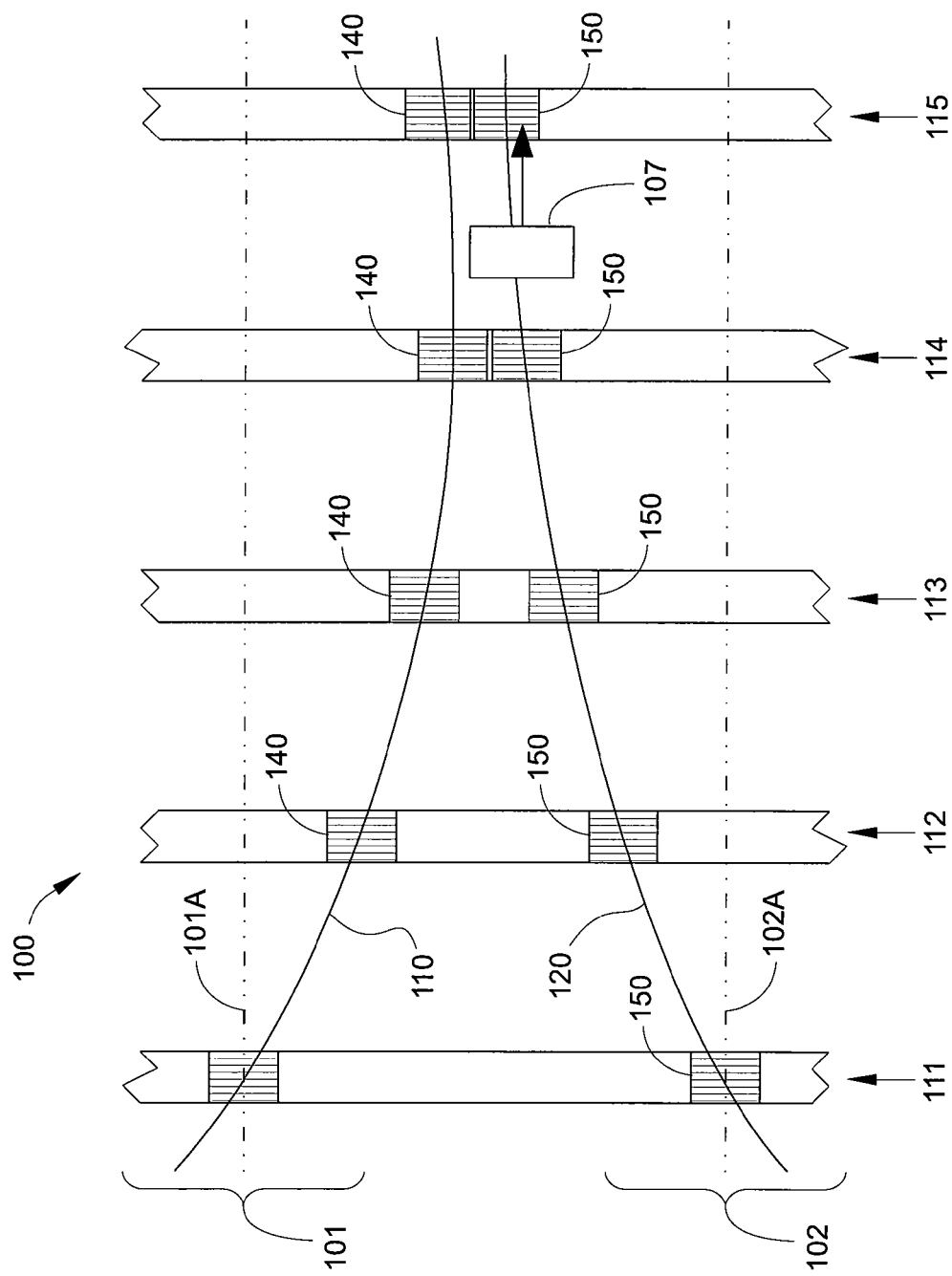
FIG. 1 schematically illustrates a portion of a storage disk and the paths followed by a write head as servo wedges are written to a first data track and a second data track.
Figure 2:
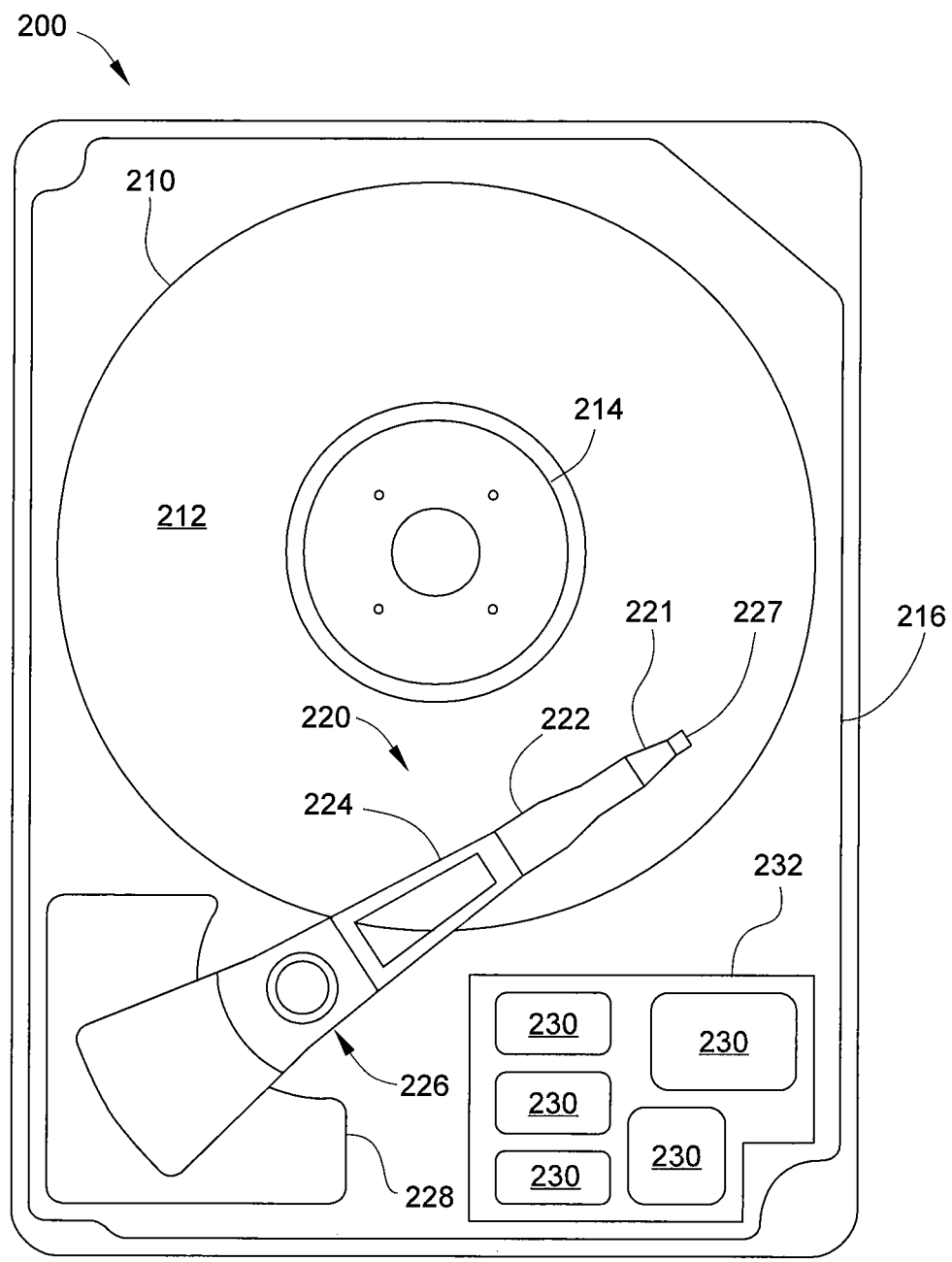
FIG. 2 is a schematic view of an exemplary disk drive, according to an embodiment of the invention.

FIG. 2 is a schematic view of an exemplary disk drive 200, according to an embodiment of the invention. For clarity, disk drive 200 is illustrated without a top cover. Disk drive 200 includes at least one storage disk 210 that is rotated by a spindle motor 214. Spindle motor 214 is mounted on a base plate 216. An actuator arm assembly 220 is also mounted on base plate 216, and has a slider 221 mounted on a flexure arm 222 with a read/write head 227. Flexure arm 222 is attached to an actuator arm 224 that rotates about a bearing assembly 226. Voice coil motor 228 moves slider 221 relative to storage disk 210, thereby positioning read/write head 227 over the desired concentric data storage track disposed on the surface 212 of storage disk 210. Spindle motor 214, read/write head 227, and voice coil motor 228 are coupled to electronic circuits 230, which are mounted on a printed circuit board 232. The electronic circuits 230 include a read channel, a microprocessor-based controller, random access memory (RAM) and/or a flash memory device. For clarity of description, disk drive 200 is illustrated with a single storage disk 210 and a single actuator arm assembly 220. Disk drive 200 may also include multiple storage disks and multiple actuator arm assemblies. In addition, each side of storage disk 210 may have an associated read/write head coupled to a flexure arm.

When data is transferred to or from storage disk 210, actuator arm assembly 220 sweeps an arc between an inner diameter (ID) and an outer diameter (OD) of storage disk 210. Actuator arm assembly 220 accelerates in one angular direction when current is passed through the voice coil of voice coil motor 228 and accelerates in an opposite direction when the current is reversed, allowing for control of the position of actuator arm assembly 220 and attached read/write head 227 with respect to storage disk 210. Voice coil motor 228 is coupled with a servo system known in the art that uses positioning data read from servo sectors that are embedded in each data track of storage disk 210 by read/write head 227 to determine the position of read/write head 227 over a data storage track. The servo system determines an appropriate current to drive through the voice coil of voice coil motor 228, and drives said current using a current driver and associated circuitry.

Figure 3:
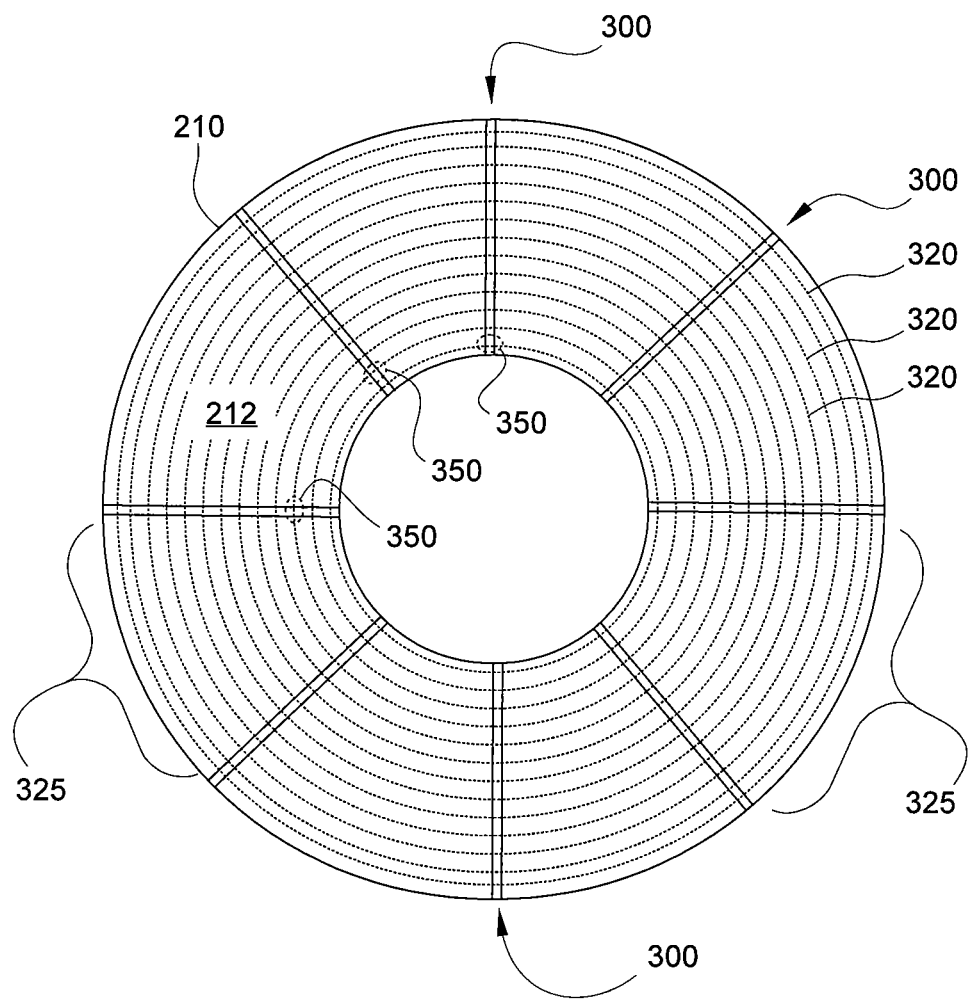
FIG. 3 illustrates a storage disk with data organized after servo wedges 300 have been written on the storage disk.

FIG. 3 illustrates storage disk 210 with data organized after servo wedges 300 have been written on storage disk 210. Servo wedges 300 may be written on storage disk 210 by either a media writer or by disk drive 200 itself via a self servo-write (SSW) process. Servo wedges 300 are substantially radially aligned and are shown crossing data storage tracks 320. Each servo wedge 300 includes a plurality of servo sectors 350. Each servo sector 350 contains servo information that defines the radial position and track pitch, i.e., spacing, of data storage tracks 320. Servo sectors 350 are described in greater detail below in conjunction with FIG. 4. In practice, servo wedges 300 may be somewhat curved, for example, servo wedges 300 may be configured in a spiral pattern that mirrors the path that would be followed by read/write head 227 if it were to move across the stroke while storage disk 210 is not spinning. Such a curved pattern advantageously results in the wedge-to-wedge timing being independent of the radial position of read/write head 227. For simplicity, servo wedges 300 are depicted as substantially straight lines in FIG. 3.

Storage disk 210 also includes concentric data storage tracks 320 located in data sectors 325 for storing data. Data storage tracks 320 are positionally defined by the servo information written in servo sector 350. Each servo sector 350 contains a reference signal that is read by read/write head 227 during read and write operations to position read/write head 227 above a desired data storage track 320. Typically, the actual number of data storage tracks 320 and servo wedges 300 included on storage disk 210 is considerably larger than illustrated in FIG. 2. For example, storage disk 210 may include hundreds of thousands of concentric data storage tracks 320 and hundreds of servo wedges 300.

Figure 4:
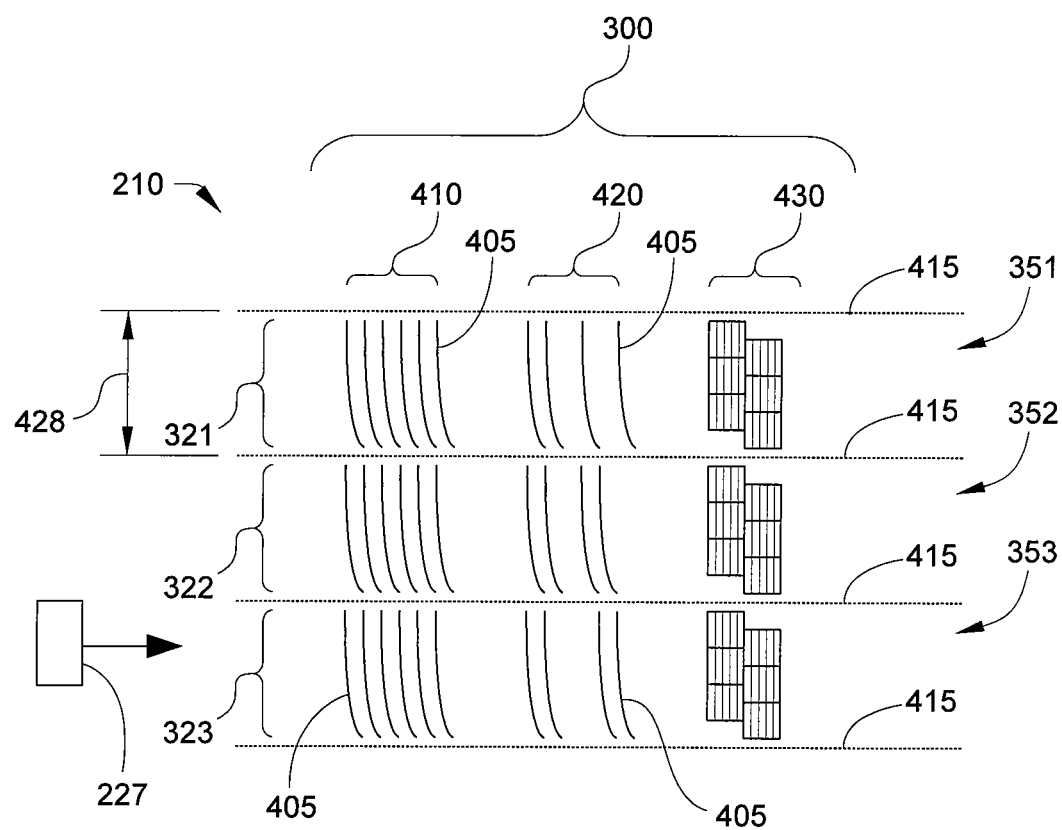
FIG. 4 illustrates a partial schematic diagram of a portion of a servo wedge that is disposed on a storage disk and includes servo information for three adjacent data storage tracks.

FIG. 4 illustrates a partial schematic diagram of a portion of a servo wedge 300 that is disposed on storage disk 210 and includes servo information for three adjacent data storage tracks 321-323. The servo information for data storage tracks 321-323 is included in servo sectors 351-353, respectively, and is written onto storage disk 210 by either a media writer or during a servo-self-write process for one data storage track at a time. Servo sectors 351-353 each include a preamble field 410, a Gray code area 420, and servo burst patterns 430 for tracks 321-323, respectively. Preamble field 410 is used as a timing reference to synchronize the timing of the read channel immediately prior to reading Gray code area 420 and servo burst patterns 430, and is also used as an amplitude reference to adjust signal amplitude. Gray code area 420 provides coarse position of the read/write head by indicating the current track number. Servo burst patterns 430 are null-pattern servo bursts, and are used to determine the fine position of read/write head 227 relative to a specific data storage track.

Preamble field 410, Gray code area 420, and servo burst patterns 430 are each formed by a plurality of magnetic flux transitions 405. Ideally, magnetic flux transitions 405 are straight lines oriented perpendicular to data storage tracks 321-323, and are stitched together, i.e., connected or slightly overlapped, at preamble stitch lines 415, where preamble stitch lines 415 define the demarcation between adjacent preamble fields 410. When magnetic flux transitions 405 are stitched together, they form substantially continuous lines, so that preamble fields 410 form a radially continuous preamble field. In this way, the timing reference provided by preamble field 410 during normal operation of disk drive 200 is uniform for servo wedge 300 regardless of the exact radial position of read/write head 227. Given such a timing reference by preamble field 410, a precise location of read/write head 227 relative to a specific data storage track can be determined by demodulating the servo-burst signal generated when read/write head 227 subsequently passes over servo burst pattern 430.

In practice, when written on the surface of storage disk 210, magnetic flux transitions 405 are not always perpendicular to data storage tracks 321-323. Instead, near preamble stitch lines 415, magnetic flux transitions 405 can be curved, and consequently are not stitched together at preamble stitch lines 415 to form substantially continuous lines that are perpendicular to storage tracks 321-323. This is due to skew angle of read/write head 227 with respect to data storage tracks 320, fringe field effects, side writing, and other factors. Because of the non-ideal shape of magnetic flux transitions 405 in some regions of servo wedge 300, substantial phase shift of the timing reference provided by preamble field 410 can result when read/write head 227 is positioned near one of preamble stitch lines 415. Thus, the timing reference provided by preamble field 410 can vary depending on the radial position of read/write head 227, which results in unwanted phase variation of the preamble. Preamble phase variation is known to directly affect the demodulation of certain burst patterns, such as the null-pattern, resulting in a significant error in the measured position of read/write head 227 and exacerbating track squeeze. For example, the non-ideal shape of magnetic flux transitions 405 can produce a preamble phase shift of ±30° or 40°, translating to an error in position of read/write head 227 as great as 10% of track width 458—a significant disturbance in the position of read/write head 227 relative to a desired ideal track position. Because such a disturbance is the product of permanently written features on the surface of the storage disk, it is considered "written-in" repeatable runout (RRO).

High-frequency disturbances from an ideal track location caused by written-in RRO can be removed or minimized by associating a correction factor with each servo sector on a particular data storage track during the initial calibration and set-up of the disk drive. In contrast, low-frequency disturbances from the ideal track location is difficult to compensate using such correction factors, and can produce unwanted track squeeze. According to embodiments of the invention, a method of writing servo information for a data storage track 320 on storage disk 210 substantially eliminates such low-frequency disturbances in the position of the servo information embedded in the data storage track, thereby reducing track squeeze.

Figure 5:
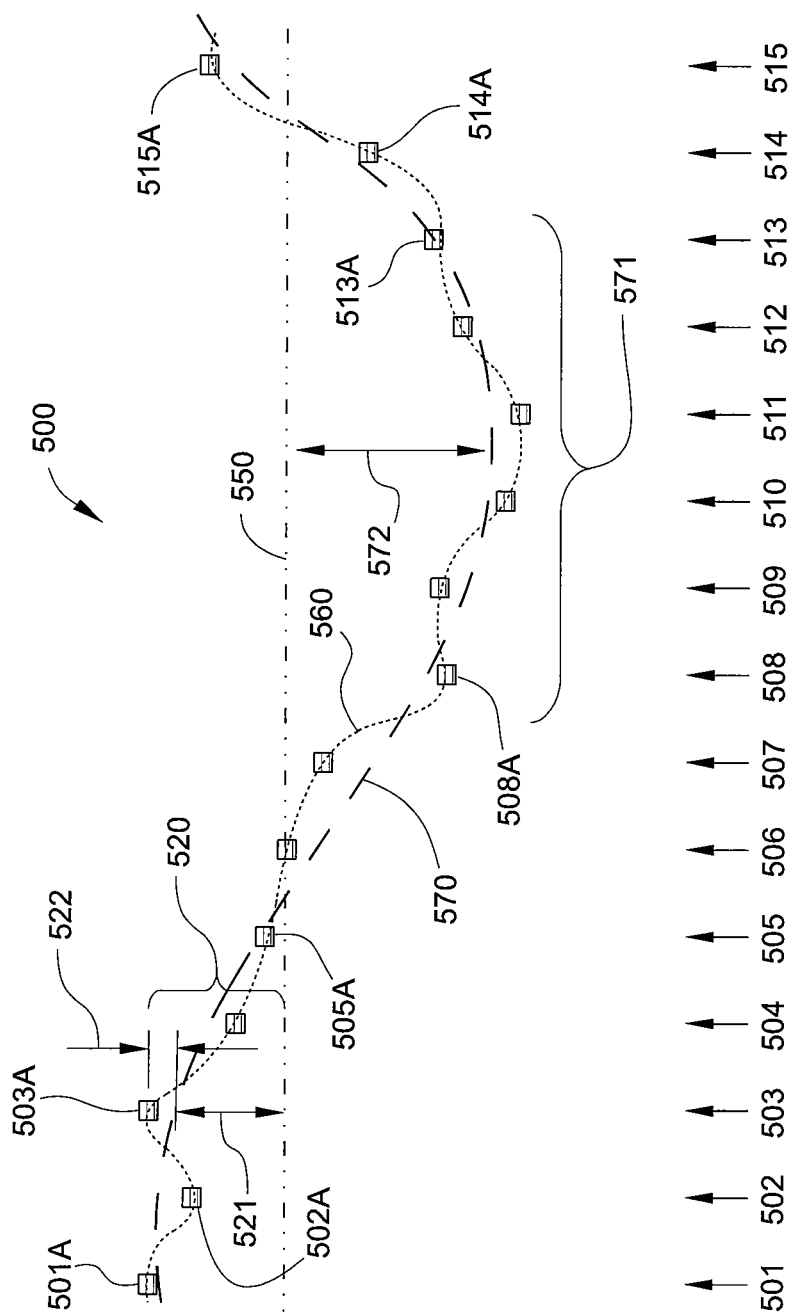
FIG. 5 schematically illustrates a portion of a data storage track on a storage disc that is spanned by servo wedge locations and has preamble fields written for each of the servo wedge locations in a fashion known in the art.

FIG. 5 schematically illustrates a portion of a data storage track 500 on storage disc 210 that is spanned by servo wedge locations 501-515 and has preamble fields 501A-515A written for each of servo wedge locations 501-515 in a fashion known in the art. Preamble fields 501A-515A are substantially similar to preamble fields 410 in FIG. 4, and are written in servo wedge locations 501-515, respectively, during a single revolution of storage disk 210. Preamble fields 501A-515A may also include other servo sector information that has been written in the same revolution. Such servo sector information may include position information about the radial location of read/write head 227, such as Gray code areas 420 and/or portions of servo burst patterns 430.

As shown, preamble fields 501A-515A, which are made up of multiple magnetic flux transitions, are each written near but displaced from an ideal track line 550 for data storage track 500 by a displacement 520. Displacements 520 of preamble fields 501A-515A from ideal track line 550 correspond to fluctuations in the position of a servo writer while preamble fields 501A-515A are being written. For reference, a servo writer path 560 indicates the path followed by the servo writer as preamble fields 501A-515A are written during the revolution of storage disk 210. The position of the servo writer includes high- and low-frequency fluctuations from ideal track line 550 while writing preamble fields 501A-515A. Consequently, displacements 520 of preamble fields 501A-515A each include a low-frequency component 521 and a high-frequency component 522. These high- and low-frequency fluctuations are illustrated by servo writer path 560 in FIG. 5. For clarity, displacement 520, low-frequency component 521, and high-frequency component 522 are only illustrated for preamble field 503A in FIG. 5. Because preamble fields 501A-515A are written during a single revolution of storage disk 210, the preamble stitch line between data storage track 500 and adjacent data storage tracks closely follows servo writer path 560.

As is known in the art, position correction factors can be determined and applied for each of servo sectors on data storage track 500 to remove high-frequency components 522 of displacements 520. In this way, data storage track 500 follows a relatively smooth path proximate ideal track line 550 that is more easily followed by read/write head 227 during normal operation of disk drive 200, and that avoids high-frequency track squeeze. With the use of such correction factors, high-frequency components 522 can be substantially eliminated, but low-frequency components 521 are difficult to reduce. Consequently, low-frequency track squeeze can still occur along portions of data storage track 500 in which preamble fields 501A-515A have significant low-frequency displacement components, since such components cause low-frequency variations of the preamble stitch line from its ideal position. By way of illustration, preamble stitch line 570 indicates an approximate location of the preamble stitch line for data storage track 500. As shown, preamble stitch line 570 has a portion 571 with a significant low-frequency displacement 572 that can produce low-frequency track squeeze.

According to embodiments of the invention, preamble fields for a particular data storage track are written over multiple revolutions of a storage disk to eliminate low-frequency variations of the preamble stitch line from an ideal position of the preamble stitch line. By writing the preamble fields for one data storage track over multiple revolutions, and by writing the preamble fields in each revolution to non-consecutive servo wedges, low-frequency variations of the preamble stitch line from its ideal position can be converted to high-frequency variations of the preamble stitch line that do not produce low-frequency track squeeze.

Figure 6A:
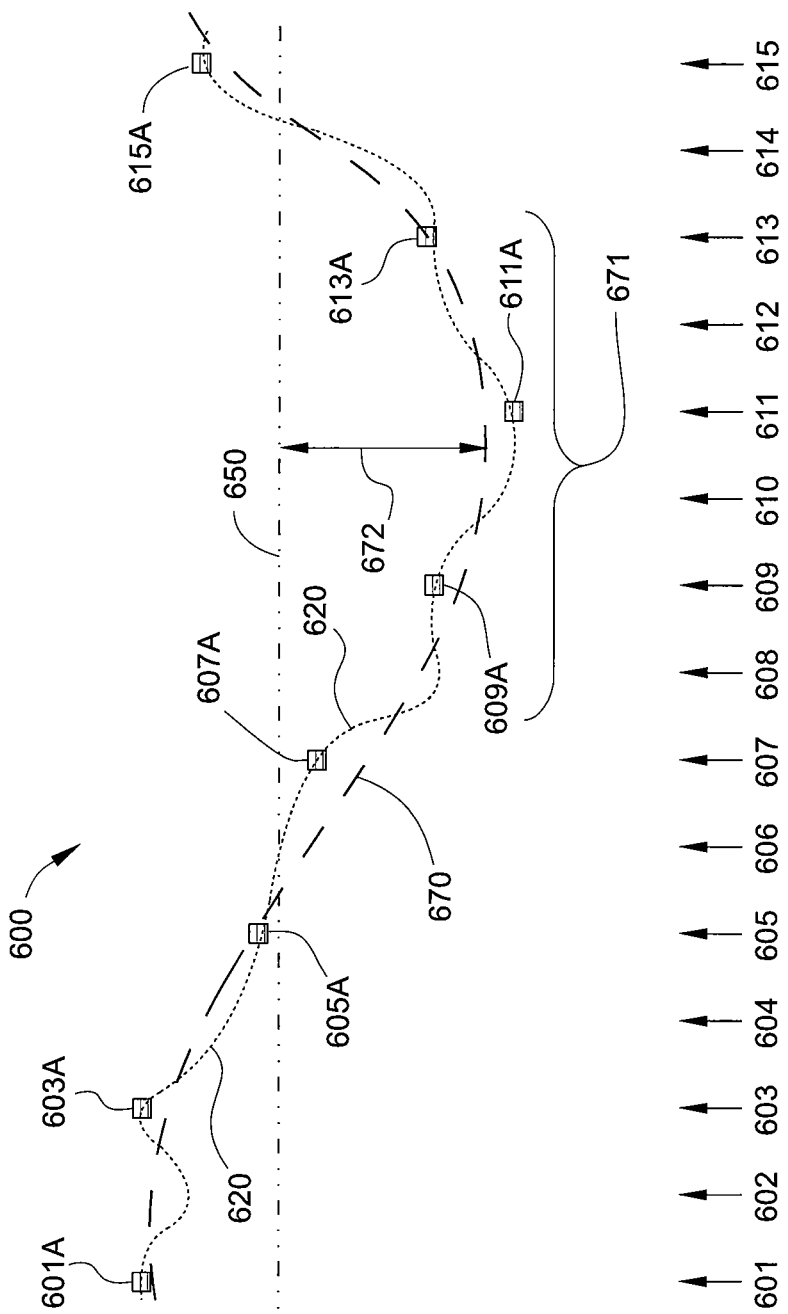
FIG. 6A schematically illustrates a portion of a data storage track that is spanned by servo wedge locations and has preamble fields written for a portion of the servo wedge locations, according to an embodiment of the invention.

FIG. 6A schematically illustrates a portion of a data storage track 600 that is spanned by servo wedge locations 601-615 and has preamble fields written for a portion of servo wedge locations 601-615, according to an embodiment of the invention. The preamble fields illustrated in FIG. 6 are written to non-consecutive servo wedge locations on data storage track 600 as a servo writer follows a path 620 during a first revolution of storage disk 210. Specifically, preamble fields 601A, 603A, 605A, 607A, 609A, 611A, 613A, and 615A are written for data storage track 600 at servo wedge locations 601, 603, 605, 607, 609, 611, 613, and 615, respectively. For reference, a hypothetical preamble stitch line 670 is depicted in FIG. 6 indicating the location of the preamble stitch line for data storage track 600 if only servo information at servo wedge locations 601, 603, 605, 605, 609, 611, 613, and 615 were used to control the radial position of read/write head 227 in operation. As shown, hypothetical preamble stitch line 670 includes a region 671, in which a significant low-frequency displacement 672 from ideal track line 650 is present that can produce low-frequency track squeeze.

Figure 6B:
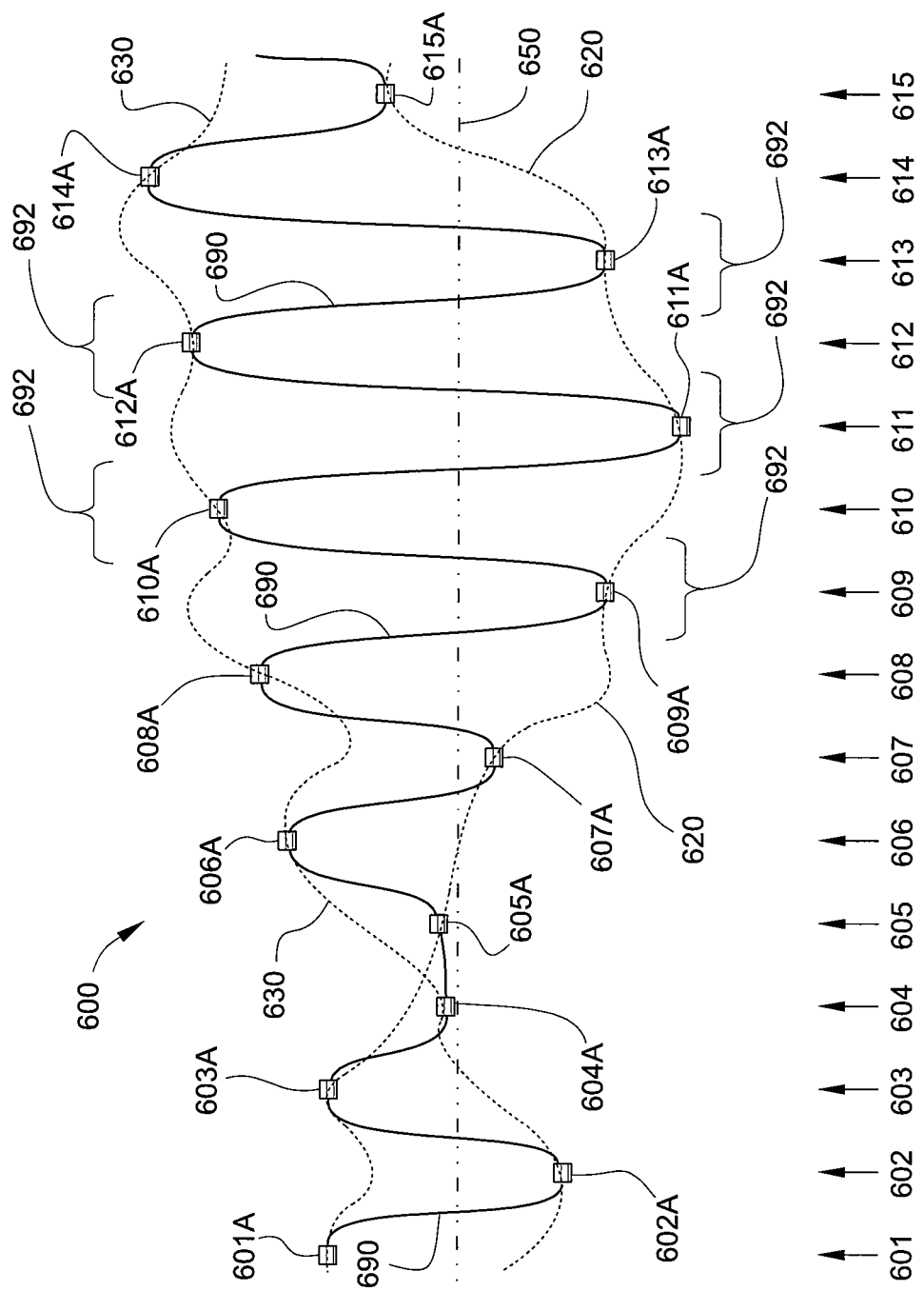
FIG. 6B schematically illustrates data storage track with preamble fields written for the remaining portion of the servo wedge locations in FIG. 6A, according to an embodiment of the invention.

FIG. 6B schematically illustrates data storage track 600 with preamble fields written for the remaining portion of servo wedge locations 601-615, according to an embodiment of the invention. The preamble fields written for the remaining portion of servo wedge locations 601-615, i.e., servo wedge locations 602, 604, 606, 608, 610, 612, and 614, are written as the servo writer follows a path 630 during a second revolution of storage disk 210. Specifically, preamble fields 602A, 604A, 606A, 608A, 610A, 612A, and 614A are written at servo wedge locations 602, 604, 606, 608, 610, 612, and 614, respectively. A preamble stitch line 690 is depicted in FIG. 6 indicating the location of the preamble stitch line for data storage track 600 after all preamble fields 601A-615A have been written to storage disk 210. As shown, the displacement of preamble stitch line 690 from ideal track line 650 has very little or no low-frequency components and instead includes primarily high-frequency components. Consequently, regions 692 of data storage track 600 in which the displacement of preamble stitch line 690 from ideal track line 650 is relatively large can be compensated for using position correction factors at each such servo-wedge location, thereby reducing track squeeze.

Thus, by writing preamble fields 601A-615A over two or more revolutions of storage disk 210, low-frequency components of the displacement between preamble stitch line 690 and ideal track line 650 are broken up into a large number of high-frequency displacements. In other words, preamble fields are written to a first group of non-consecutive servo sectors on a data storage track during one revolution of storage disk 210, and preamble fields are written to a second group of non-consecutive servo sectors on the data storage track during a subsequent revolution of storage disk 210. The preamble fields of the second group are interspersed between the preamble fields of the first group, i.e., a preamble field of the second group is written on the data storage track at an azimuth position between the azimuth positions of two preamble fields of the first group.

In the embodiment illustrated in FIGS. 6A, 6B, preamble fields for all servo wedges of data storage track 600 are written over two revolutions of storage disk 210. In other embodiments, the writing of preamble fields for a specific data storage track is distributed over three or more revolutions of storage disk 210.

Figure 7:
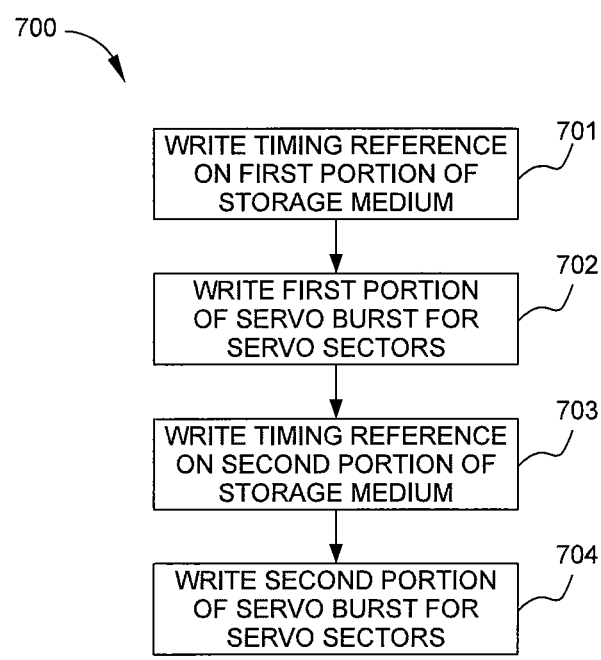
FIG. 7 sets forth a flowchart of method steps for of writing servo information on a magnetic storage medium while the magnetic storage medium is rotated, according to one embodiment of the present invention.

FIG. 7 sets forth a flowchart of method steps for writing servo information on a magnetic storage medium while the magnetic storage medium is rotated, according to one embodiment of the present invention. Although the method steps are described in conjunction with the disk drive 200 in FIG. 2, persons skilled in the art will understand that any disk drive configured to perform the method steps, in any order, is within the scope of the invention.

As shown, method 700 begins at step 701, during a first revolution of a magnetic storage medium. Storage disk 210 of disk drive 200 is one example of such a magnetic storage medium. In step 701, a timing reference, such as preamble field 410, is written on a first portion of storage disk 210. The timing reference may be written by a media writer or by read/write head 227 of disk drive 200 during a servo-self write process. The first portion of storage disk 210 includes a group of non-consecutive servo sectors on a specific data storage track 320, and the timing reference is written on each of the non-consecutive servo sectors. For example, in one embodiment, the timing reference is written to every third servo sector on the specific data storage track 320.

In step 702, a first portion of a servo burst, such as servo burst 430, is also written to some or all of the servo sectors on the data track 320 of interest. For example, the first portion of the servo burst may be one or two of magnetic flux transitions 405 when servo burst 430 includes five to ten total flux transitions. In some embodiments, the first portion of the servo burst is written to each servo sector embedded in the data track of interest. It is noted that in some embodiments, step 702 takes place during the same revolution as step 701, i.e., during the first revolution of the magnetic storage medium.

In step 703, during a second revolution of storage disk 210, the timing reference is written on a second portion of storage disk 210. The second portion of storage disk 210 also includes a second group of non-consecutive servo sectors on a specific data storage track 320, and the timing reference is written on each of the non-consecutive servo sectors in the second group. It is noted that the servo sectors of the second group are interspersed between the servo sectors of the first group. In this way, low-frequency track squeeze can be prevented in disk drive 200 by breaking up low-frequency displacements of the servo writer used to write the timing references to data storage track 320.

In step 704, a second portion of each servo burst is also written to some or all of the servo sectors on the data track 320 of interest. For example, the second portion of the servo burst may be one or two of magnetic flux transitions 405 when servo burst 430 includes five to ten total flux transitions. In such an embodiment, the use of multiple revolutions to write the preamble fields to all servo sectors on a specific data storage track 320 does not affect the time required to write servo information to the data storage track. This is because servo bursts for the data storage track can be written during the same revolutions that the preamble fields are being written for the data storage track. It is noted that in some embodiments, step 704 takes place during the same revolution as step 703, i.e., during the second revolution of the magnetic storage medium.

While embodiments of the invention are described herein in terms of disk drive 200 during a servo-self-write process, embodiments of the present invention can be applied to any apparatus writing servo sector information on a storage disk, including servo writers.

In sum, embodiments of the invention provide systems and methods for writing servo information on a magnetic storage medium to reduce track squeeze. By writing the preamble fields for one data storage track over multiple revolutions, and by writing the preamble fields in each revolution to non-consecutive servo wedges, low-frequency variations of the preamble stitch line from an ideal position can be converted to high-frequency variations of the preamble stitch line that advantageously do not produce low-frequency track squeeze. Often servo bursts are also written in multiple steps, so if the number of preamble write steps is less than or equal to the number of burst write steps, then the technique this method does not increase the time required for self servo writing.

While the foregoing is directed to embodiments of the present invention, other and further embodiments of the invention may be devised without departing from the basic scope thereof, and the scope thereof is determined by the claims that follow.

I claim:

1. A method of writing servo information on a magnetic storage medium while the magnetic storage medium is rotated, the method comprising:
    during a first revolution of the magnetic storage medium, writing a timing reference on a first portion of the magnetic storage medium and a first portion of a servo burst on the magnetic storage medium; and
    during a second revolution of the magnetic storage medium, writing a timing reference on a second portion of the magnetic storage medium and a second portion of the servo burst on the magnetic storage medium,
    wherein the first portion of the magnetic storage medium comprises a plurality of non-consecutive servo sectors, and the timing reference written on the first portion is written on each of the non-consecutive servo sectors of the first portion, and
    wherein the second portion of the magnetic storage medium comprises a plurality of non-consecutive servo sectors that are interlaced between the non-consecutive servo sectors of the first portion of the magnetic storage medium, and the timing reference written on the second portion is written on each of the non-consecutive servo sectors of the second portion.

2. The method of claim 1, wherein the non-consecutive servo sectors of the first portion of the magnetic storage medium and the non-consecutive servo sectors of the second portion of the magnetic storage medium are disposed at a common radial position on the magnetic storage medium.

3. The method of claim 2, wherein the common radial position corresponds to a data track of the magnetic storage medium.

4. The method of claim 2, wherein the servo burst comprises a null-pattern servo burst.

5. The method of claim 2, further comprising, after writing all timing references for the common radial position, writing timing references at a second radial position.

6. The method of claim 1, wherein the timing references are written during a servo-self-write process.

7. The method of claim 1, wherein the timing references are written by a media writer.

8. The method of claim 1, wherein the timing references each comprise a preamble field that includes a plurality of magnetic flux transitions.

* * * * *